(12) United States Patent
Parks

(10) Patent No.: US 10,458,583 B2
(45) Date of Patent: Oct. 29, 2019

(54) UNLOCKING TOOL FOR A QUICK CONNECTOR ASSEMBLY

(71) Applicant: Brian A. Parks, Fenton, MI (US)

(72) Inventor: Brian A. Parks, Fenton, MI (US)

(73) Assignee: A. RAYMOND ET CIE, Grenoble (FR)

( * ) Notice: Subject to any disclaimer, the term of this patent is extended or adjusted under 35 U.S.C. 154(b) by 996 days.

(21) Appl. No.: 14/841,149

(22) Filed: Aug. 31, 2015

(65) Prior Publication Data
US 2017/0059072 A1 Mar. 2, 2017

(51) Int. Cl.
*F16L 37/14* (2006.01)
*F16L 37/098* (2006.01)

(52) U.S. Cl.
CPC ......... *F16L 37/144* (2013.01); *F16L 37/0982* (2013.01); *F16L 2201/10* (2013.01)

(58) Field of Classification Search
CPC .. F16L 37/144; F16L 37/0982; F16L 2201/10
USPC .......................................... 285/39, 319, 321
See application file for complete search history.

(56) References Cited

U.S. PATENT DOCUMENTS

| | | | |
|---|---|---|---|
| 5,187,851 A | 2/1993 | Klinger | |
| 5,533,761 A * | 7/1996 | Ostrander | F16L 37/0982 285/308 |
| 5,782,502 A * | 7/1998 | Lewis | F16L 37/144 285/305 |
| 7,178,837 B2 * | 2/2007 | Yoshino | F16L 37/0985 285/305 |
| 2004/0066034 A1 * | 4/2004 | Takayanagi | F16L 3/1226 285/93 |
| 2007/0132235 A1 | 6/2007 | Catlow | |
| 2008/0315576 A1 | 12/2008 | Moretti et al. | |
| 2010/0276924 A1 * | 11/2010 | Gillet | F16L 37/088 285/93 |
| 2013/0093161 A1 | 4/2013 | Savsek et al. | |

(Continued)

FOREIGN PATENT DOCUMENTS

| | | |
|---|---|---|
| CN | 202109128 U | 1/2012 |
| CN | 103068670 A | 4/2013 |

(Continued)

OTHER PUBLICATIONS

European search report issued in co-pending EP application No. 16842589.0, dated Nov. 29, 2018.

(Continued)

*Primary Examiner* — James M Hewitt, II
(74) *Attorney, Agent, or Firm* — Dickinson Wright PLLC

(57) ABSTRACT

The quick release tool includes a U-shaped body which presents a base that has a first side and a second side. The body also has a pair of legs that are spaced laterally from one another and extend away from the first side of the base to respective distal ends. Each of the distal ends presents a pair of ledges that are spaced longitudinally from one another to receive fingers on the locker of the quick connector assembly. The base of the U-shaped body presents a living hinge which is spaced laterally between the legs for pivoting the distal ends of the legs away from one another in response to the application of a force onto the second side of the base, thereby allowing the locker to be moved from the locked position to the unlocked position.

6 Claims, 9 Drawing Sheets

(56) References Cited

U.S. PATENT DOCUMENTS

| | | | |
|---|---|---|---|
| 2013/0154255 A1* | 6/2013 | Daimon | F16L 37/12 285/81 |
| 2013/0221665 A1* | 8/2013 | Okazaki | F16L 37/0985 285/317 |
| 2013/0307263 A1* | 11/2013 | Parks | F16L 37/144 285/319 |
| 2014/0001752 A1 | 1/2014 | Parks et al. | |
| 2014/0167410 A1 | 6/2014 | Hess et al. | |
| 2016/0245441 A1 | 8/2016 | Klein et al. | |

FOREIGN PATENT DOCUMENTS

| | | | |
|---|---|---|---|
| DE | 102010016972 A1 * | 8/2011 | F16L 25/0045 |
| EP | 1526320 A1 | 4/2005 | |
| JP | 2003294185 A | 10/2003 | |
| JP | 2004518911 A | 6/2004 | |
| JP | 2006322615 A | 11/2006 | |
| JP | 2008519948 A | 6/2008 | |

OTHER PUBLICATIONS

First Office Action issued in co-pending Chinese Appln. No. 201680056555.5, dated Feb. 27, 2019.

* cited by examiner

FIG. 6
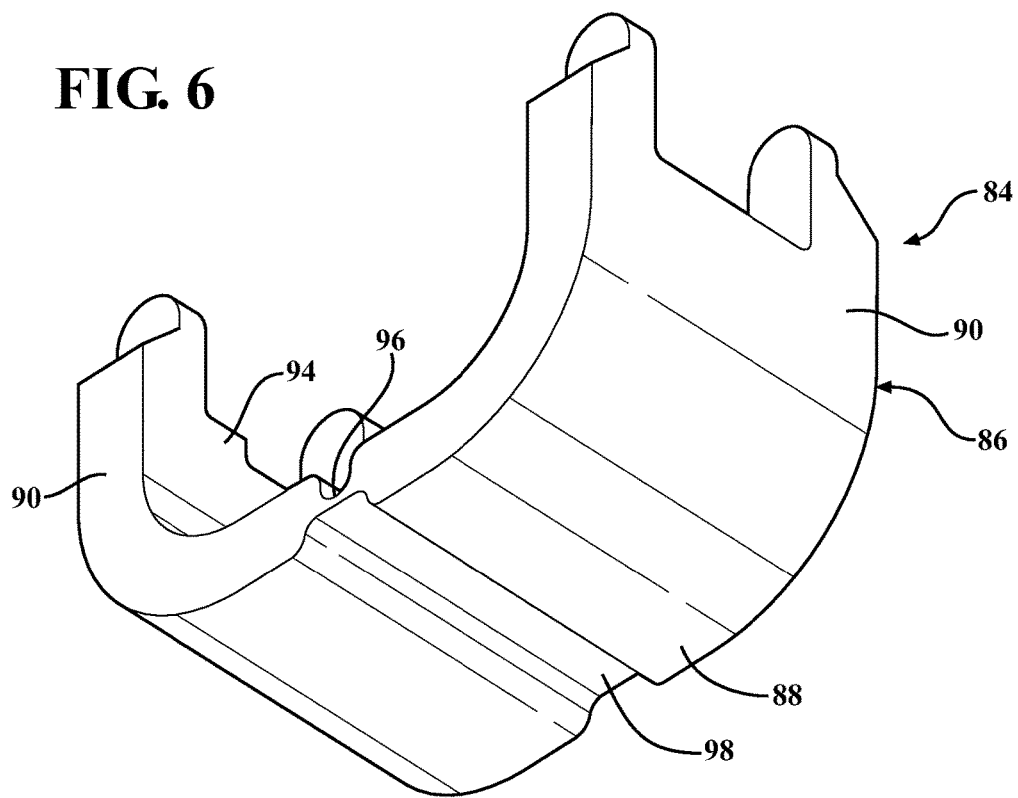
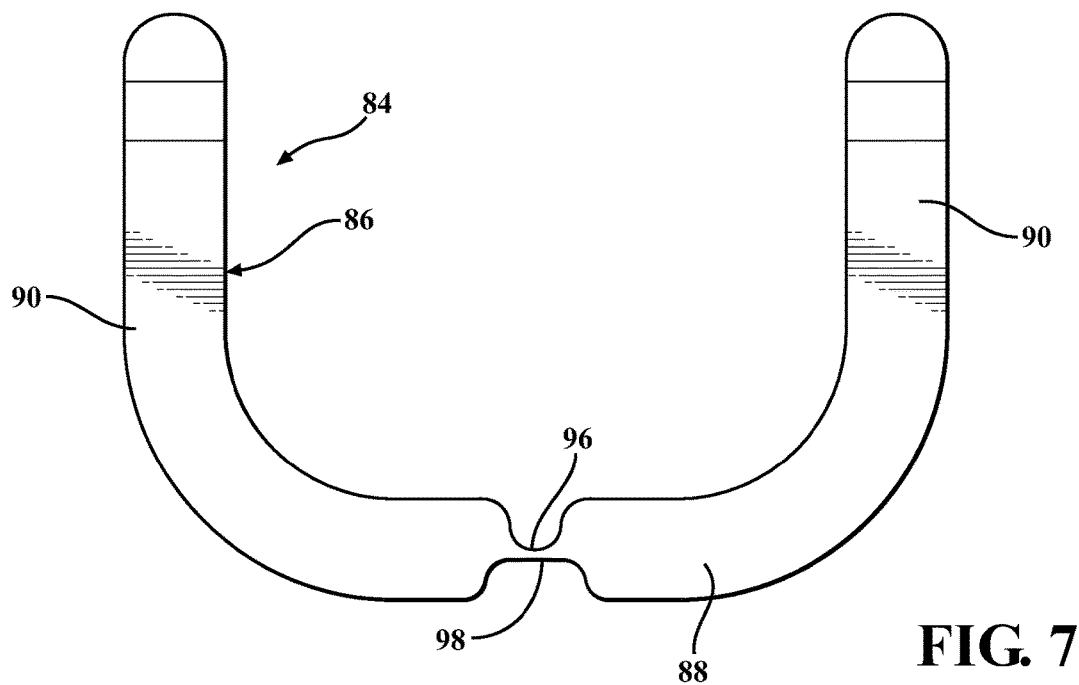
FIG. 7

UNLOCKING TOOL FOR A QUICK CONNECTOR ASSEMBLY

BACKGROUND OF THE INVENTION

1. Field of the Invention

The present invention relates to quick connector assemblies for establishing fluid communication between two fluid lines (such as pipes or hoses), and more specifically, to tools for unlocking quick connector assemblies to allow quick detachment of the fluid lines.

2. Description of the Prior Art

Quick connector assemblies are used in many different applications for quickly connecting and establishing fluid communication between a male end form and a hose or another tube. It is important that the male end form can quickly engage with the quick connector assembly to minimize assembly time and labor, e.g., on an assembly line. At the same time, the quick connector assembly must be very reliable and must establish a fluid-tight seal with the male end form which will not leak or otherwise disengage from the male end form. In the automotive industry, quick connector assemblies are often used for fuel lines, and failure of the quick connector assembly could pose a serious safety risk. To mitigate this risk, manufacturers have developed assemblies that cannot be latched down until the male end form is completely inserted into the quick connector.

One known type of quick connector assembly is taught in U.S. Pat. No. 9,115,834 and includes a housing having a female receiving portion for receiving a male end form and a stem portion for receiving a hose. A locker is movable between an unlocked position for allowing insertion or withdrawal of the male end form and a locked position for engaging the bead to retain the male end form in the housing. The locker includes a ring that prevents the locker from moving to the locked position until the male end form is inserted into the housing by a predetermined distance, whereupon the ring breaks to allow the male end form to be fully inserted into the housing. Once the male end form is fully inserted into the housing and the bead passes the locker, the locker may be moved downwardly into the locked position to engage the bead and hold the male end form in a locked position within the housing. The locker may then be moved back to the unlocked position for allowing withdrawal of the male end form. However, once the male end form is removed from the quick connector assembly, because the ring has been broken, there is nothing to prevent the locker from moving back into the locked position, even when the male end form is not disposed in the housing. Thus, this type of quick connector assembly only prevents the locker from moving to the locked position until the quick connector assembly first receives a male end form. Thereafter, there is no safety mechanism for preventing the locker from moving to the locked position, even when the male end form is not inserted into the housing of the quick connector assembly. A user could accidentally move the locker to the locked position without the male end form being properly locked within the housing.

SUMMARY OF THE INVENTION

One aspect of the present invention provides for a quick release tool for moving a locker of a quick connector assembly from a locked position to an unlocked position, thereby allowing removal of an end form from an inner bore of the quick connector assembly. The quick release tool includes a U-shaped body which presents a base that has a first side and a second side. The body also has a pair of legs that are spaced laterally from one another and extend away from the first side of the base to respective distal ends. Each of the distal ends presents a pair of ledges that are spaced longitudinally from one another to receive fingers on the locker of the quick connector assembly. The base of the U-shaped body presents a living hinge which is spaced laterally between the legs for pivoting the distal ends of the legs away from one another in response to the application of a force onto the second side of the base, thereby allowing the locker to be moved from the locked position to the unlocked position.

The quick release tool is advantageous because it allows the locker to be moved from the locked position to the unlocked position with one smooth and simple motion by the user. This unlocked process can be implemented by a skilled user with little effort and even with only one hand. Additionally, being that it is of one integral piece, the quick release tool may be manufactured cost effectively through, for example, injection molding.

According to a another aspect of the present invention, the living hinge in the base of the quick release tool is defined by at least one groove formed into at least one of the first and second sides of the base to provide the base with a reduced wall thickness at the living hinge.

According to yet another aspect of the present invention, the living hinge has grooves formed into both the first and second sides of the base of the quick release tool.

According to still another aspect of the present invention, the grooves extend the entire longitudinal length of the base of the quick release tool.

According to a further aspect of the present invention, each of the distal ends of each of the legs of the quick release tool presents a U-shaped slot which opens in a direction opposite of the base and wherein ledges are positioned within the U-shaped slot.

Another aspect of the present invention is related to a fluid connection assembly. The fluid connection assembly includes a housing with an inner bore for receiving a male end form that has a bead. A locker is movable relative to the housing between a locked position for locking the male end form within the inner bore of the housing and an unlocked position for allowing the male end form to be inserted into or removed from the inner bore of the housing. The locker has a pair of outside legs which present tool engagement sections and wherein each of the tool engagement sections has a pair of spaced apart fingers. The fluid connection assembly also includes a quick release tool for moving the locker from the locked condition to the unlocked condition. The quick release tool has a quick release tool body which is generally U-shaped and presents a base with a first side and a second side. The quick release tool body also has a pair of quick release tool legs which are spaced laterally from one another and extend away from the first side of the base to respective distal ends. Each distal end presents a pair of ledges that are spaced longitudinally from one another to seat against the fingers of the tool engagement sections of the locker. The base of the U-shaped quick release tool body has a living hinge which is spaced laterally between the quick release tool legs for pivoting the distal ends of the outside legs of the locker away from one another in response to the application of a force onto the second side of the base to allow movement of the locker from the locked position to the unlocked position.

Yet another aspect of the present invention is a method of removing a male end form from a quick connector assembly. The method includes the step of providing a quick connector assembly with a housing and a locker and wherein the locker is in a locked position retaining the male end form within the inner bore of the housing. The housing has an inner bore, and the locker has a pair of outside legs. Each of the outside legs has a tool engaging section. The method proceeds with the step of providing a quick release tool with a one-piece body that is generally U-shaped and presents a base and a pair of quick release tool legs. The quick release tool legs extend from a first side of the base, and the base has a living hinge which is spaced between the quick release tool legs. The method continues with the step of engaging the quick release tool legs with the tool engaging sections of the outside legs of the locker. The method proceeds with the step of applying a force to the living hinge on a second side of the base of the quick release tool. The method continues with the step of automatically pivoting the quick release tool legs away from one another in response to the application of the force at the living hinge. The method proceeds with the steps of moving the locker from the locked position to the unlocked position and removing the male end form from the inner bore of the housing.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 6 is another perspective view of the exemplary embodiment of the quick release tool;

FIG. 7 is a front view of the exemplary embodiment of the quick release tool;

DETAILED DESCRIPTION OF THE ENABLING EMBODIMENTS

Figure 1:
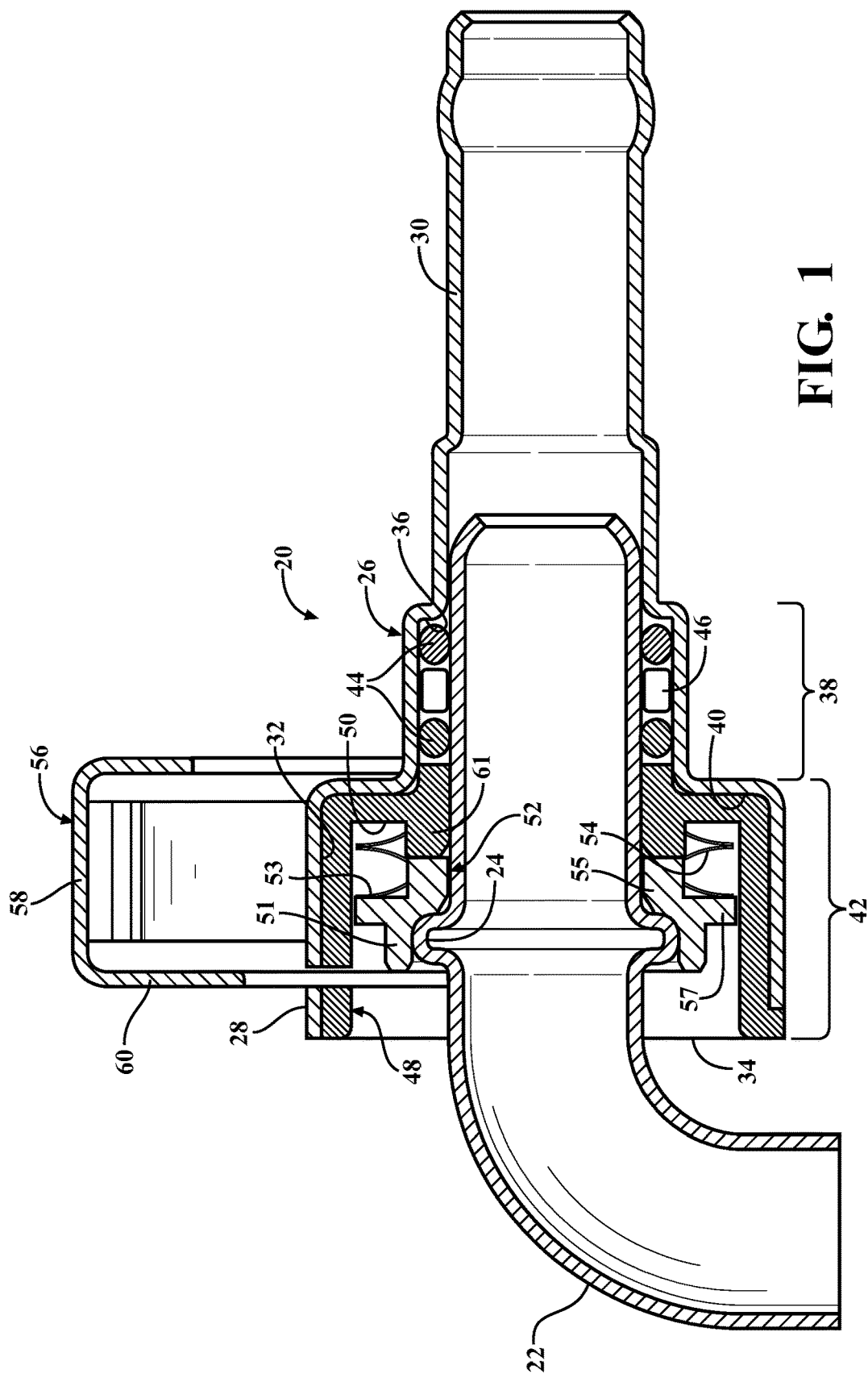
FIG. 1 is a cross-sectional view of the exemplary embodiment of the quick connector assembly with the locker in an unlocked position.
Figure 2:
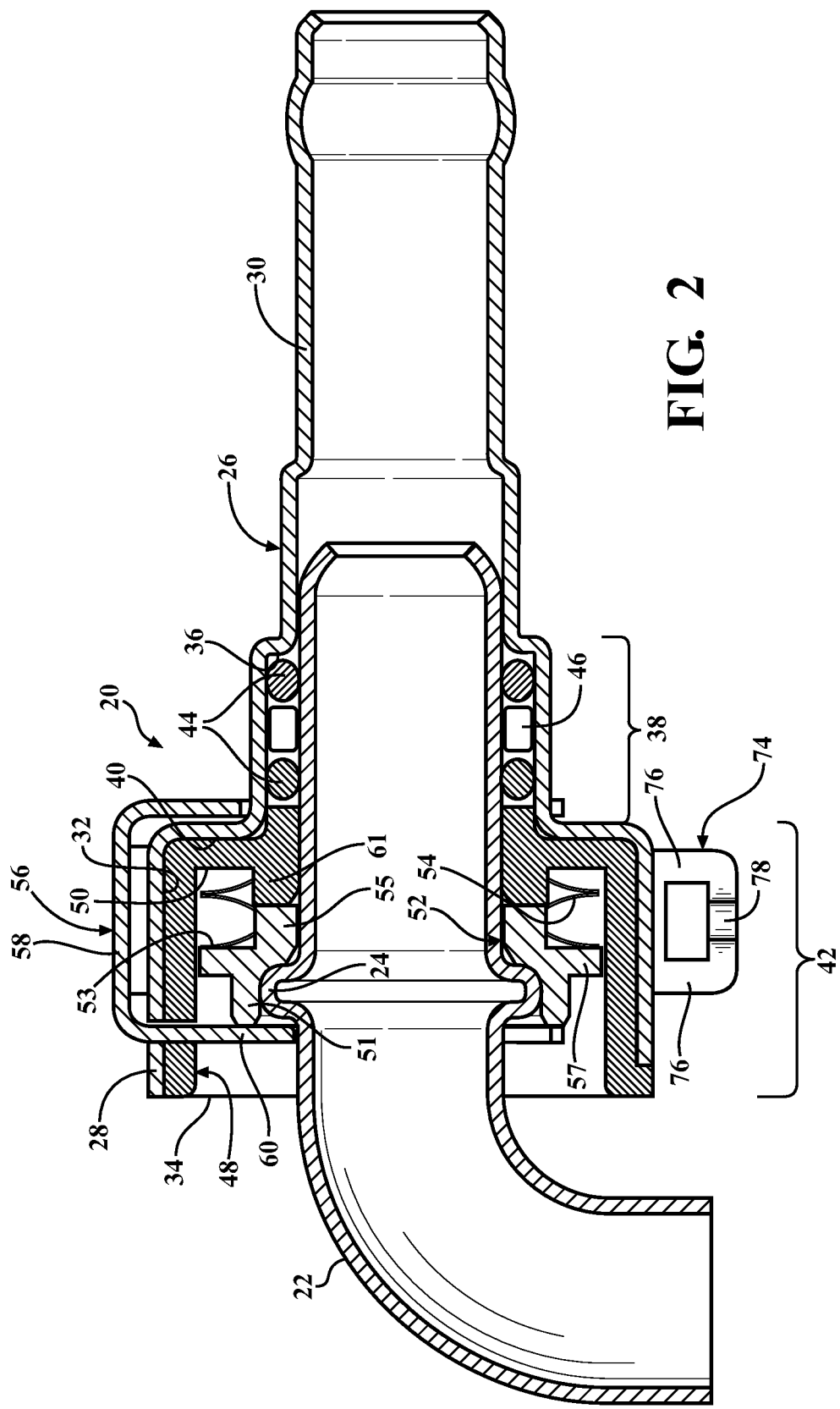
FIG. 2 is a cross-sectional view of the exemplary embodiment of the quick connector assembly with the locker in a locked position.

Referring to the Figures, wherein like numerals indicate corresponding parts throughout the several views, an exemplary quick connector assembly 20 for establishing fluid communication between two fluid lines, such as a male end form 22 and another hose or tube (not shown) is generally shown in FIGS. 1-4. The male end form 22 is preferably of metal, has a generally tubular shape with a bead 24 and extends forwardly of the bead 24 to a tube end. However, it should be appreciated that the male end form 22 could be of any desirable material and could have a range of different shapes and sizes.

The exemplary quick connector assembly 20 includes a housing 26, generally indicated, which has a female receiving portion 28 for receiving the aforementioned male end form 22 and a stem portion 30 for receiving and establishing fluid communication with a hose or any other type of tube (not shown). In the exemplary embodiment, the housing 26 is made of metal and is shaped through a deep drawing process. However, it should be appreciated that the housing 26 could be of any suitable type of formable material including, for example, polymeric materials or composites. The housing 26 could also be shaped through any suitable process, such as machining, injection molding, stamping, etc.

The housing 26 has an inner bore 32 which extends in an axial direction between the female receiving portion 28 and the stem portion 30 for conveying a fluid from the male end form 22 to the tube or hose (not shown) mated with the stem portion 30. One end of the female receiving portion 28 presents an inlet opening 34 for receiving the male end form 22 into the inner bore 32. The inner bore 32 of the female receiving portion 28 is twice-counterbored to present a first shoulder 36 opening up to a first section 38 having a first diameter and a second shoulder 40 opening up to a larger second section 42 which has a second diameter that is larger than the first diameter. The exemplary stem portion 30 extends through a ninety degree (90°) curve. However, it should be appreciated that the stem portion 30 could extend linearly or through any curve or series of curves.

A pair of sealing rings 44 is disposed in the first section 38 of the inner bore 32 with one of the sealing rings 44 abutting the first shoulder 36. A spacer 46 is axially sandwiched within the first section 38 of the bore 32 between the two sealing rings 44. The sealing rings 44 are preferably O-rings which could be made of a variety of elastic materials depending on the fluid and operating temperatures of the quick connector assembly 20. The exemplary spacer 46 is of a thermoplastic material and is produced through an injection molding process; however, the spacer 46 could be of any suitable material and could be formed through any suitable process. It should also be appreciated that the first section 38 could include any number (including zero) of sealing rings 44.

The quick connector assembly 20 of the exemplary embodiment further includes a generally cylindrically shaped bushing 48 disposed in the second section 42 of the inner bore 32 and extending between the second shoulder 40 and the inlet opening 34. The bushing 48 also extends radially inwardly along the second shoulder 40 of the housing 26 to present a first spring seat 50 (discussed in further detail below) and axially into the first section 38 towards the first sealing ring 44 for retaining the first and second sealing rings 44 and the spacer 46 in the first section 38 of the inner bore 32. The exemplary bushing 48 is of a thermoplastic material and is produced through an injection molding process. However, it should be appreciated that the bushing 48 can be made of any suitable material and could be produced using any suitable forming process.

The quick connector assembly 20 also includes a plunger 52 that is slidably disposed within the bushing 48 and is generally annular in shape. The plunger 52 has a front section 51 with a large diameter for receiving the bead 24 of the male end form 22 and a rear section 55 with a relatively smaller diameter for receiving the portion of the male end form 22 in front of the bead 24. The plunger 52 also includes a radially extending portion 57 which is sized similarly to the opening of the bushing 48 for guiding movement of the plunger 52 within the bushing 48.

The plunger 52 also has a second spring seat 53 which faces the first spring seat 50 of the bushing 48 in the axial direction. A spring 54 is disposed in the second section 42 of the inner bore 32 and extends between the first spring seat 50 of the bushing 48 and the second spring seat 53 of the plunger 52 for biasing the plunger 52 toward the inlet opening 34 and into a resting position, which is shown in FIG. 1 and discussed in further detail below. The spring 54 of the exemplary embodiment is a wave spring 54 formed of stainless steel stock material; however, it should be appreciated that any suitable type of compression spring 54 could alternately be used. The plunger 52 is preferably of a thermoplastic material and is produced through an injection molding process. However, the plunger 52 could be of any suitable material and may be produced using any suitable forming method.

Figure 8:
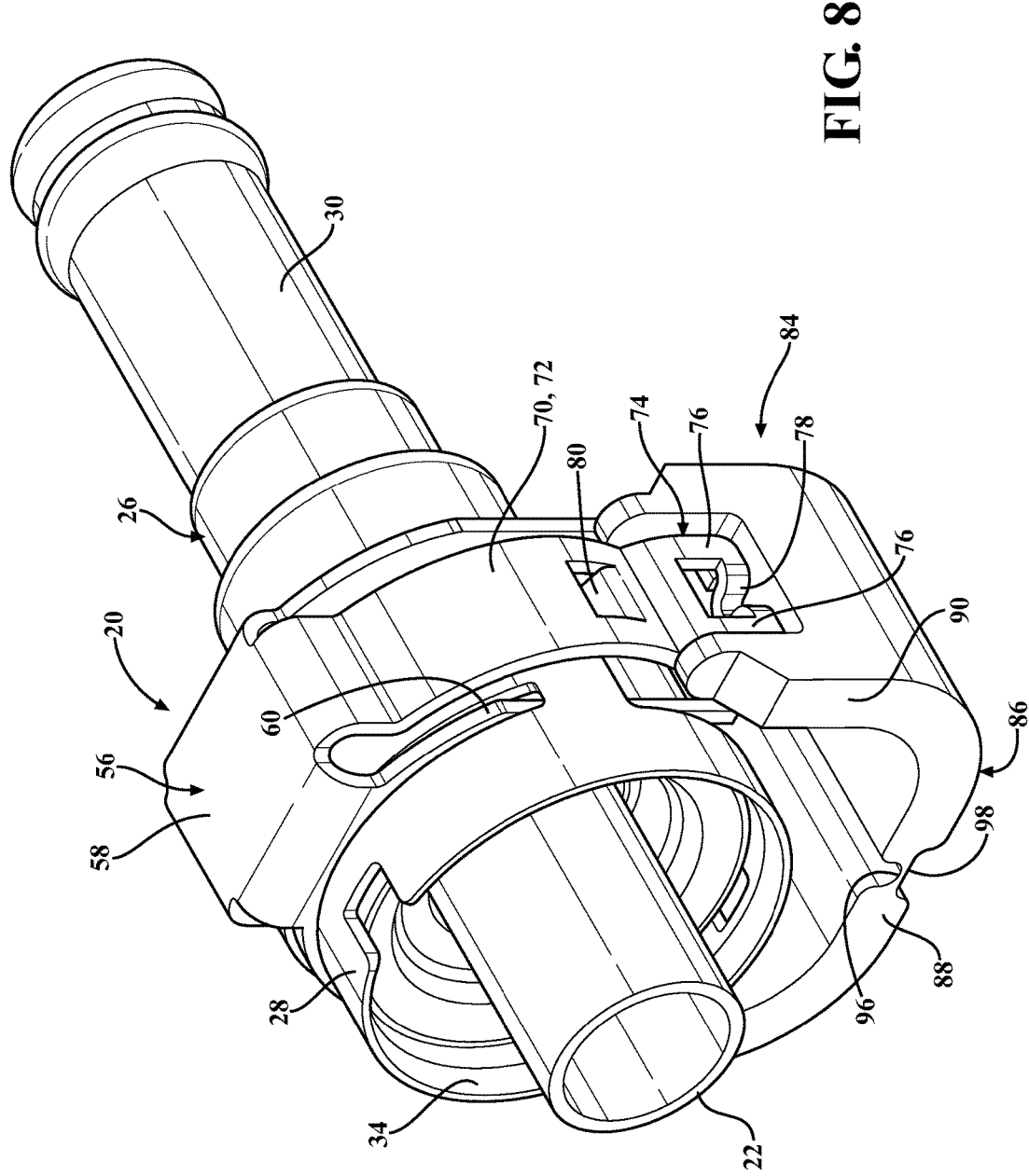
FIG. 8 is a perspective view showing the exemplary quick release tool engaged with a locker of an exemplary quick connector assembly.
Figure 9:
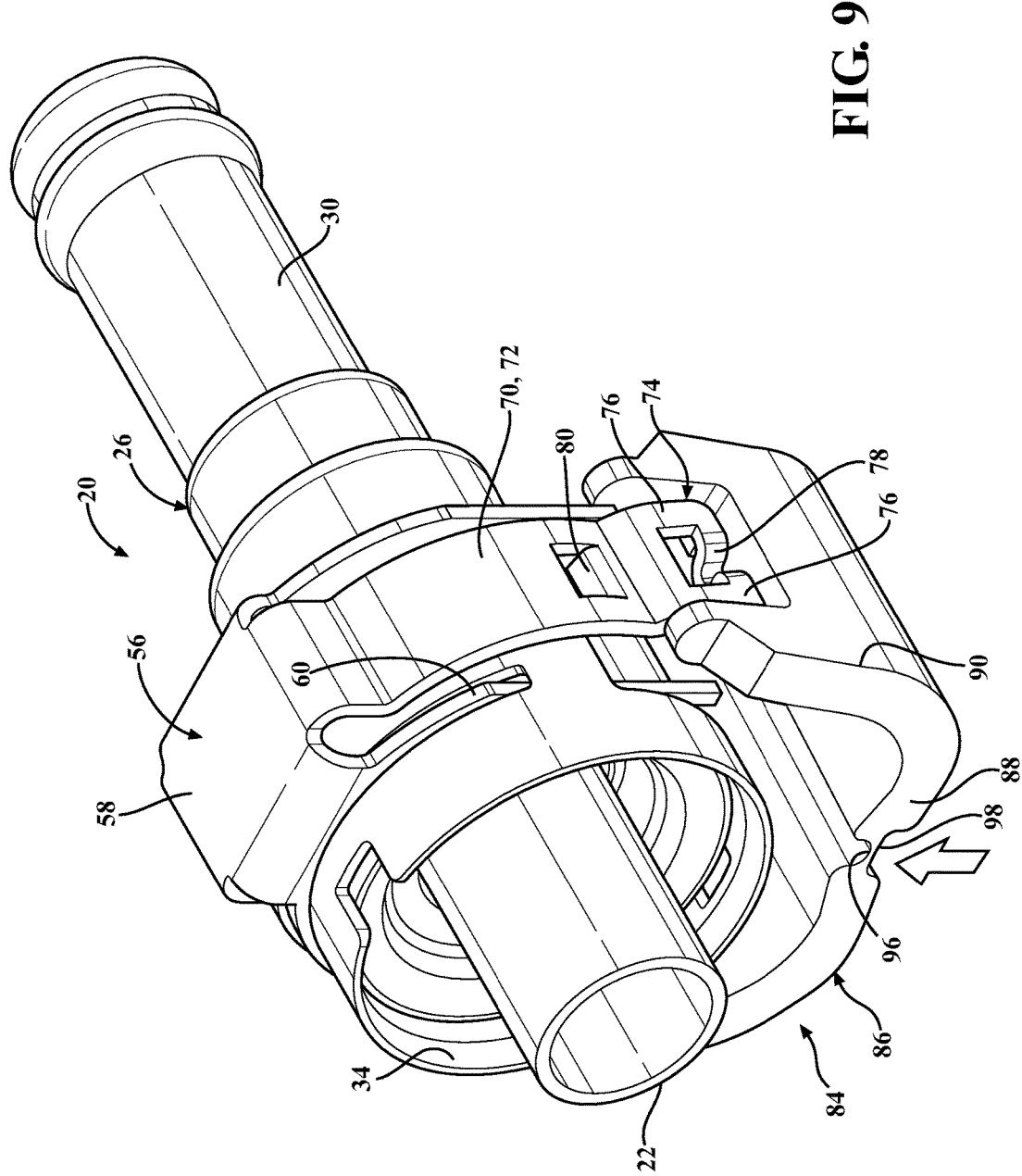
FIG. 9 is a perspective view showing the exemplary quick release tool being activated for moving the locker of the exemplary quick connector assembly from the locked position to the unlocked position.

The quick connector assembly 20 also includes a locker 56 which is movable between a locked position (FIGS. 2-4, 9 and 10) for retaining the male end form 22 in the housing 26 and an unlocked position (FIGS. 1 and 8) for allowing the male end form 22 to be inserted into or removed from the housing 26. The locker 56 includes a base 58 and a pair of inside legs 60 which extend downwardly into the inner bore 32 through at least one set of aligned upper gaps in the female receiving portion 28 of the housing 26 and in the bushing 48. The inside legs 60 have upper sections and differently shaped lower sections. The upper sections are spaced from one another by a distance that is slightly greater than the diameter of the male end form 22 but less than the diameter of the bead 24, and the lower sections are spaced by a distance that is greater than the diameter of the bead 24 of the male end form 22 but less than the diameter of the plunger 52. Thus, when the locker 56 is in the unlocked position shown in FIG. 1, the spring 54 biases the plunger 52 against the lower sections of the inside legs 60. This position of the plunger 52 is hereinafter referred to as a "resting position". Because of the larger spacing of the lower sections of the inside legs 60, the bead 24 of the male end form 22 may be inserted into the inner bore 32 of the housing 26 and past the inside legs 60 of the locker 56. That is, the male end form 24 may be inserted into the housing 26 only when the locker 56 is in the unlocked position. After the bead 24 clears the inside legs 60, the locker 56 can be moved downwardly into the locked position of FIGS. 2-4 by applying a force on the base 58. With the locker 56 in the locked position, the bead 24 of the male end form 22 is trapped between the upper sections of the inside legs 60 and the radially extending portion 57 of the plunger 52. With that, the male end form 22 has successfully been locked and sealed with the quick connector assembly 20. Additionally, because the plunger 52 is biased against the bead 24 of the male end form 22, movement of the male end form 22 relative to the housing 26 is restricted, even if the quick connector assembly 20 is vibrated, such as when a vehicle is travelling down a bumpy road. The bushing 48 may also have a flange 61 extending toward the plunger 52 for contacting the plunger 52 when the male end form 22 is locked in the quick connector assembly 20. That is, the flange 61 defines a stopping point for the insertion of the male end form 22 into the quick connector assembly 20.

Figure 3:
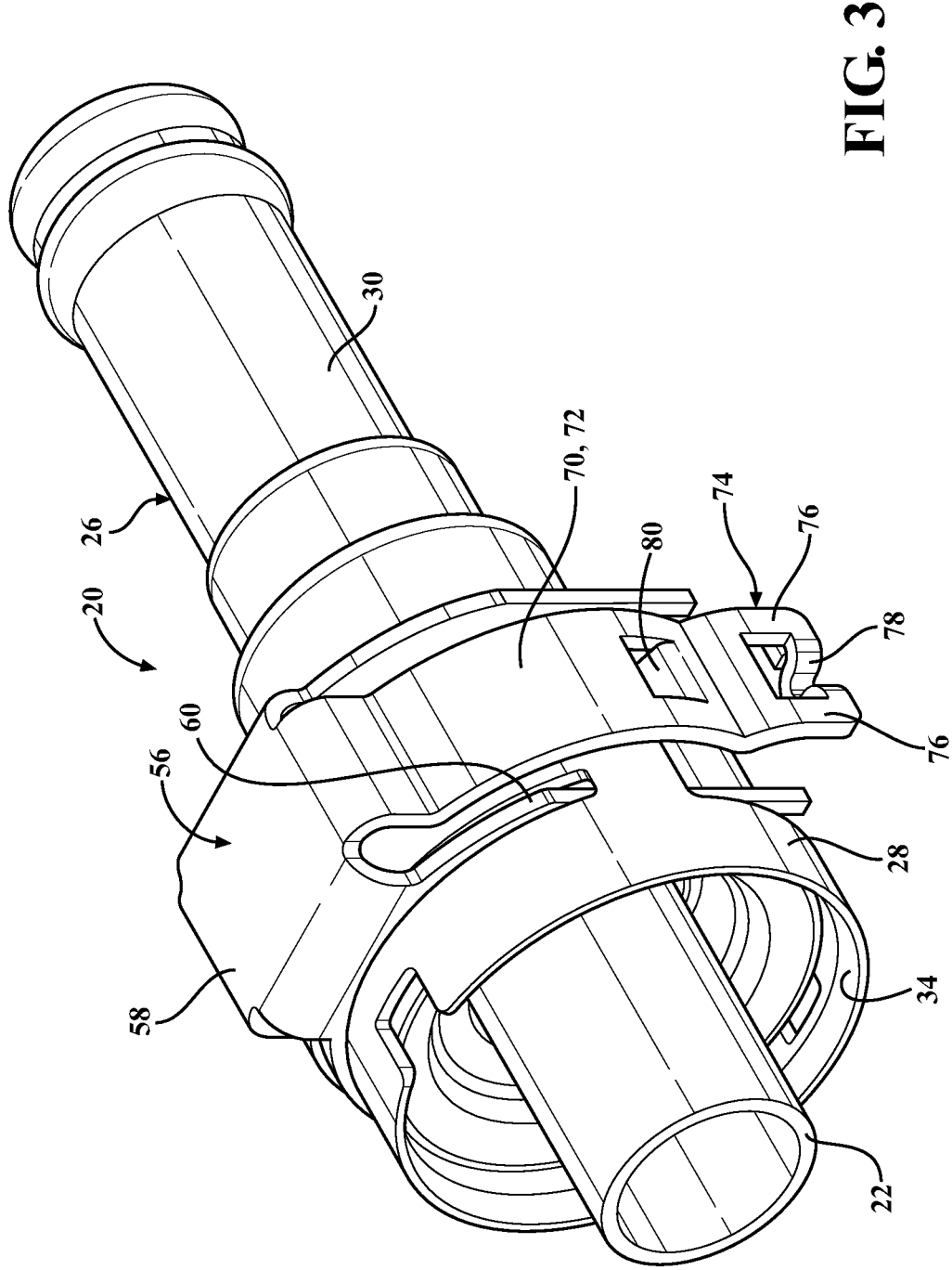
FIG. 3 is a perspective and elevation view of the exemplary embodiment of the quick connector assembly with the locker in the locked position.

As shown in FIG. 3, when the locker 56 is in the locked position, the lower sections of the inside legs 60 extend downwardly through aligned lower gaps in the bushing 48 and the housing 26 to provide evidence to the user that the locker 56 has reached the locked position. This is advantageous because it provides a visual cue to a person (such as an assembly line worker or a mechanic) that the locker 56 has reached the locked position and the male end form 22 is properly locked and sealed with the quick connector assembly 20.

The locker 56 also includes a pair of outside legs 70 which extend downwardly from the base 58 for engaging the exterior surface of the female receiving portion 28 of the housing 26. The outside legs 70 are spaced from one another and each has an arc-shaped section 72 with the same curvature as the exterior surface of the housing 26. Each outside leg 70 also extends to a tool engagement section 74 on an opposite side of the arc-shaped section 72 from the base 58. Each tool engagement section 74 includes a pair of spaced fingers 76 which extend in parallel relationship with one another in a direction away from the base 58, and the fingers 76 are interconnected with one another via a U-shaped projection 78 which projects radially inwardly, i.e., towards the housing 26.

Figure 4:
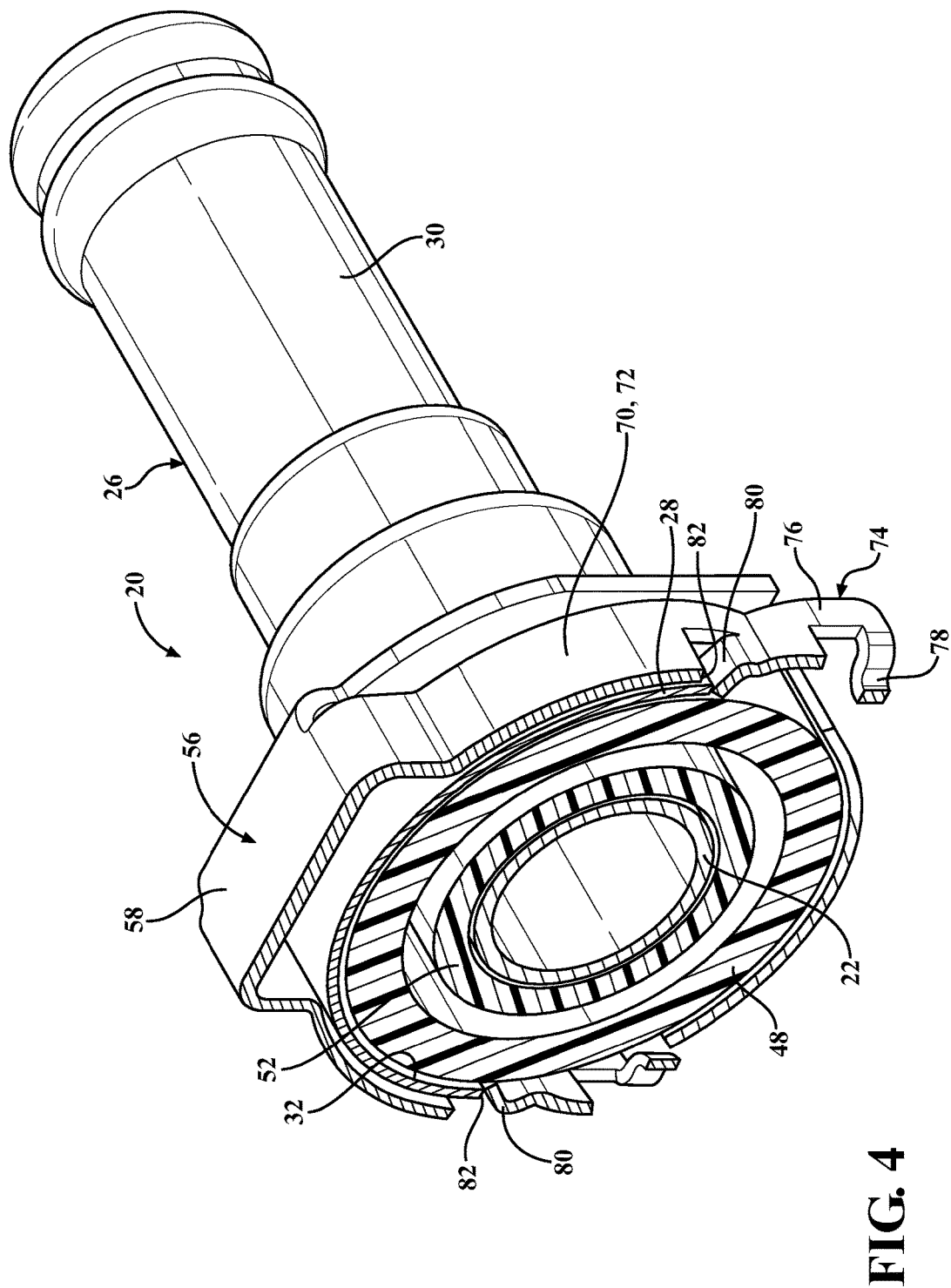
FIG. 4 is a perspective and sectional view of the exemplary embodiment of the quick connector assembly with the locker in the locked position.
Figure 5:
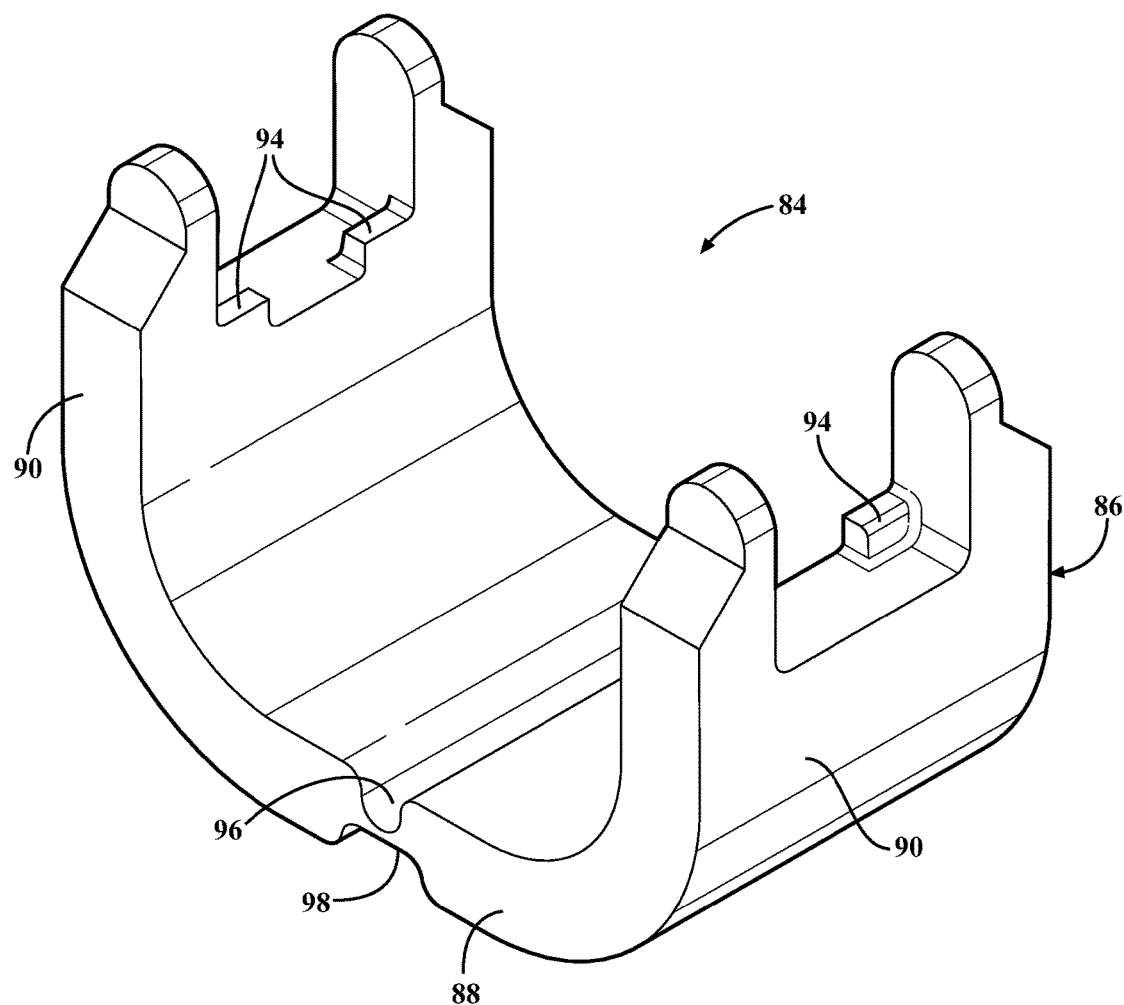
FIG. 5 is a perspective view of an exemplary embodiment of a quick release tool.

As shown in FIGS. 3 and 4, the outside legs 70 of the locker 56 also include notches or tabs 80 that extend radially inwardly from the arc-shaped section 72. The exemplary tabs 80 are formed into the outside legs 70 by cutting a small slit in the locker 56 and bending the material of the locker 56 at the slit. This is a quick process which adds very little cost or labor to the fabrication of the locker 56. As best shown in FIG. 4, the housing 26 presents a pair of windows 82 for receiving and engaging the tabs 80 of the locker 56 when the locker 56 is in the locked position to prevent the locker 56 from being unintentionally moved out of the locked position. Rather, to move the locker 56 from the locked position to the unlocked position, the outside legs 70 must be pulled apart to disengage the tabs 80 from the windows 82. This safety mechanism provides further protection to ensure that the locker 56 does not accidentally move out of the locked position. It should be appreciated that the tabs could alternately be formed on the housing and the windows could be formed on the outside legs.

To establish a fluid tight and locking connection between the quick connector assembly 20 and the male end form 22, the locker 56 must start in the unlocked position, which naturally causes the plunger 52 to be in the resting position. The male end form 22 is then urged in an axial direction into the bore 32 of the housing 26 through the receiving inlet 34. Once the male end form 22 has been inserted a sufficient distance the bore 32, the bead 24 of the male end form 22 will contact the plunger 52. Further insertion of the male end form 22 will overcome the biasing force from the wave spring 54 to move the plunger 52 axially away from the receiving inlet 34. Once the bead 24 passes the inside legs 60, the locker can then be urged downwardly into the locked position to engage the tabs 80 with the windows 82, thereby trapping the bead 24 of the male end form 22 between the plunger 52 and the upper sections of the inside legs 60 of the locker 56.

Referring now to FIGS. 5-10, a quick release tool 84 is shown for quickly and simply moving the locker 56 from the locked position to the unlocked position to remove the male end form 22 from the quick connector assembly 20. The quick release tool 84 includes a body 86 made of one piece and which is generally U-shaped when viewed from the front with a base 88 and a pair of legs 90 that are spaced from one another and extend generally transversely from the base 88 when the quick release tool 84 is in an unstressed condition. That is, in the unstressed condition, the legs 90 of the quick release tool 84 extend in spaced and parallel relationship with one another. Each of the legs 90 extends from the base 88 to a distal end which presents a U-shaped slot 92 that opens away from the base 88. Within the U-shaped slot 92, the quick release tool 84 presents a pair of ledges 94 or flanges which are spaced longitudinally form one another. The ledges 94 are spaced from one another to engage with the fingers 76 of the tool engagement section 74 of the outside legs 70 of the locker 56. The ledges 94 are disposed adjacent an inner surface of the quick release tool 84. That is, the outer surfaces of the ledges 94 are spaced inwardly from the outer surfaces of the legs 90.

The base of the exemplary quick release tool 84 has a living hinge 96, 98 which is located at an approximate midpoint between the legs 88. The exemplary living hinge 96, 98 is defined by a pair of grooves 96, 98 which extend longitudinally along the length of the base 88. One of the grooves is a first groove 96 on an upper surface or first side of the base 88, and the other groove is a second groove 98 on a lower surface or second side of the base 88. The living hinge 96, 98 has the effect of pivoting the legs 90 outwardly in response to the application of a force on the bottom surface of the base 88.

Figure 10:
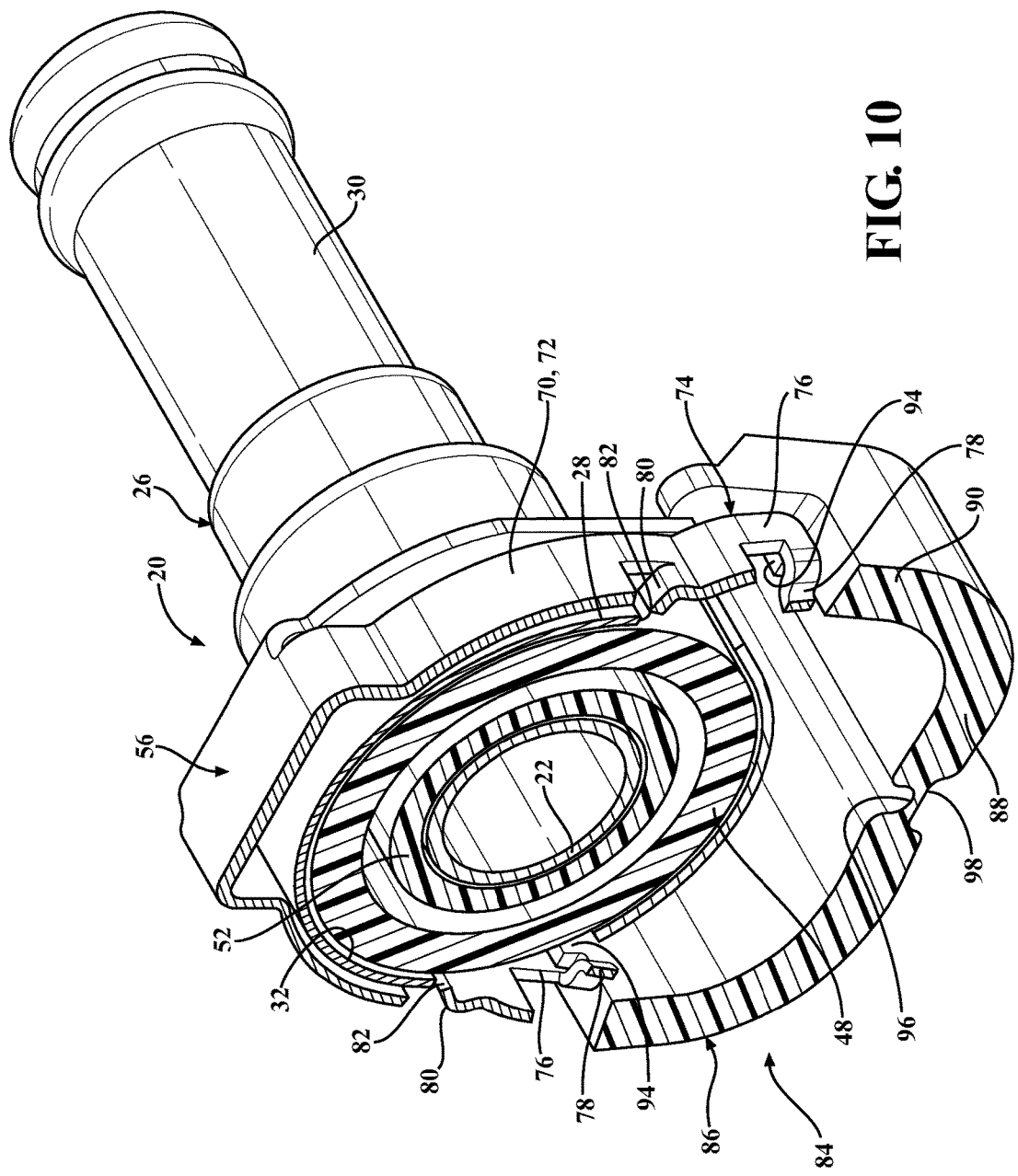
FIG. 10 is a sectional view showing the exemplary quick release tool being activated for moving the locker of the exemplary quick connector assembly from the locked position to the unlocked position.

Use of the quick release tool 84 starts with engaging the ledges 94 on the legs 90 of the quick release tool 84 with the fingers 76 on the locker 56. The legs 90 are spaced from one another such that the quick release tool 84 may be quickly and easily slid onto the tool engagement sections 74 of the locker 56. A user then presses on the base 88 at approximately the living hinge 96, 98, thereby flexing the quick release tool 84 and spreading the outside legs 70 of the locker 56. As shown in FIG. 10, this separates the tabs 80 on the locker 56 from the windows 82 on the housing 26, thereby allowing the locker 56 to be moved into the unlocked position to allow for removal of the male end form 22 from the quick connector assembly 20.

Another aspect of the present invention is a method of removing a male end form 22 from a quick connector assembly 20. The method includes the step of providing a quick connector assembly 20 with a housing 26 and a locker 56 and wherein the locker 56 is in a locked position retaining the male end form 22 within the inner bore 32 of the housing 26. The housing 26 has an inner bore 32, and the locker 56 has a pair of outside legs 70. Each of the outside legs 70 has a tool engaging section 74. The method proceeds with the step of providing a quick release tool 84 with a one-piece body 86 that is generally U-shaped and presents a base 88 and a pair of quick release tool legs 90. The quick release tool legs 90 extend from a first side of the base 88, and the base 88 has a living hinge 96, 98 which is spaced between the quick release tool legs 90. The method continues with the step of engaging the quick release tool legs 90 with the tool engaging sections 74 of the outside legs 70 of the locker 56. The method proceeds with the step of applying a force to the living hinge 96, 98 on a second side of the base 88 of the quick release tool 84. The method continues with the step of automatically pivoting the quick release tool legs 90 away from one another in response to the application of the force at the living hinge 96, 98. The method proceeds with the steps of moving the locker 56 from the locked position to the unlocked position and removing the male end form 22 from the inner bore 32 of the housing 26.

Obviously, many modifications and variations of the present invention are possible in light of the above teachings and may be practiced otherwise than as specifically described while within the scope of the appended claims.

What is claimed is:

1. A fluid connection assembly, comprising:
   a housing with an inner bore for receiving a male end form with a bead;
   a locker which is movable relative to said housing between a locked position for locking the male end form within said inner bore of said housing and an unlocked position for allowing the male end form to be inserted into or removed from said inner bore of said housing;
   said locker having a pair of outside legs which present tool engagement sections and wherein each of said tool engagement sections has a pair of spaced apart fingers;
   a quick release tool body being generally U-shaped and presenting a base with a first side and a second side;
   a pair of quick release tool legs spaced laterally from one another and extending away from said first side of said base to respective distal ends;
   each distal end presenting a pair of ledges that are spaced longitudinally from one another to seat against said fingers of said tool engagement sections of said locker;
   said base of said U-shaped quick release tool body having a living hinge which is spaced laterally between said quick release tool legs for pivoting said distal ends of said outside legs of said locker away from one another in response to the application of a force onto said second side of said base to allow movement of said locker from said locked position to said unlocked position.

2. The fluid connection assembly as set forth in claim 1 wherein each of said first and second grooves extends an entire longitudinal length of said base.

3. The fluid connection assembly as set forth in claim 1 wherein each of said distal ends presents a U-shaped slot which opens in a direction opposite of said base and wherein said ledges are positioned within said U-shaped slot.

4. A method of removing a male end form from a quick connector assembly, comprising the steps of:
   providing a quick connector assembly with a housing and a locker, the housing having an inner bore, the locker having a pair of outside legs, each of the outside legs having a tool engaging section, and the locker being in a locked position where the locker is retaining the male end form within the inner bore of the housing;
   providing a quick release tool with a one-piece body that is generally U-shaped and presents a base and a pair of quick release tool legs and wherein the quick release tool legs extending from a first side of the base and wherein the base includes a living hinge spaced between the quick release tool legs;
   engaging the quick release tool legs with the tool engaging sections of the outside legs of the locker;
   applying a force to the living hinge on a second side of the base of the quick release tool;
   automatically pivoting the quick release tool legs away from one another in response to the application of the force at the living hinge on the second side of the base to separate the outside legs of the locker from the housing of the quick connector assembly;
   moving the locker from the locked position to an unlocked position; and
   removing the male end form from the inner bore of the housing;
   wherein said living hinge is defined by at least one groove formed into at least one of said first and second sides of said base to provide said base with a reduced wall thickness at said living hinge; and wherein said at least one groove formed into at least one of said first and second sides of said base is first defined as a first groove formed into said first side of said base and a second groove formed into said second side of said base.

5. The method as set forth in claim 4 wherein the step of pivoting the quick release tool legs away from one another to separate the outside legs of the locker from the housing disengages tabs on the locker or the housing from windows on the other of the locker and the housing to allow the locker to be moved from the locked position to the unlocked position.

6. The method as set forth in claim 4 further including a plunger biasing the male end form against the locker and wherein the plunger automatically forces the male end form out of the inner bore of the housing in response to the locker moving from the locked position to the unlocked position.

* * * * *